(No Model.)
C. SINNING.
STOP MOTION FOR LASTING MACHINES, &c.
No. 471,495. Patented Mar. 22, 1892.
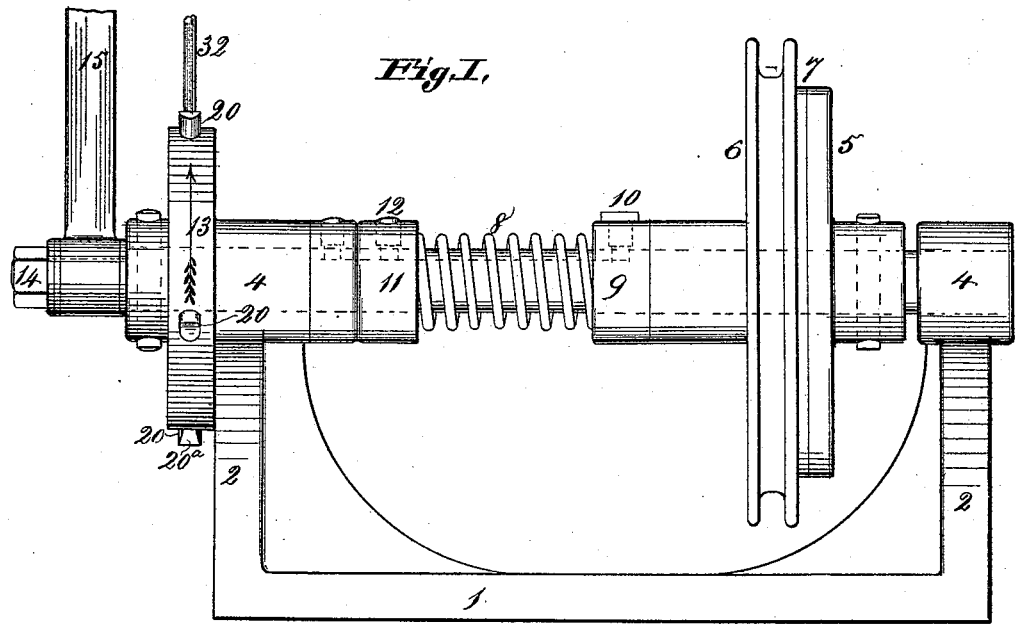
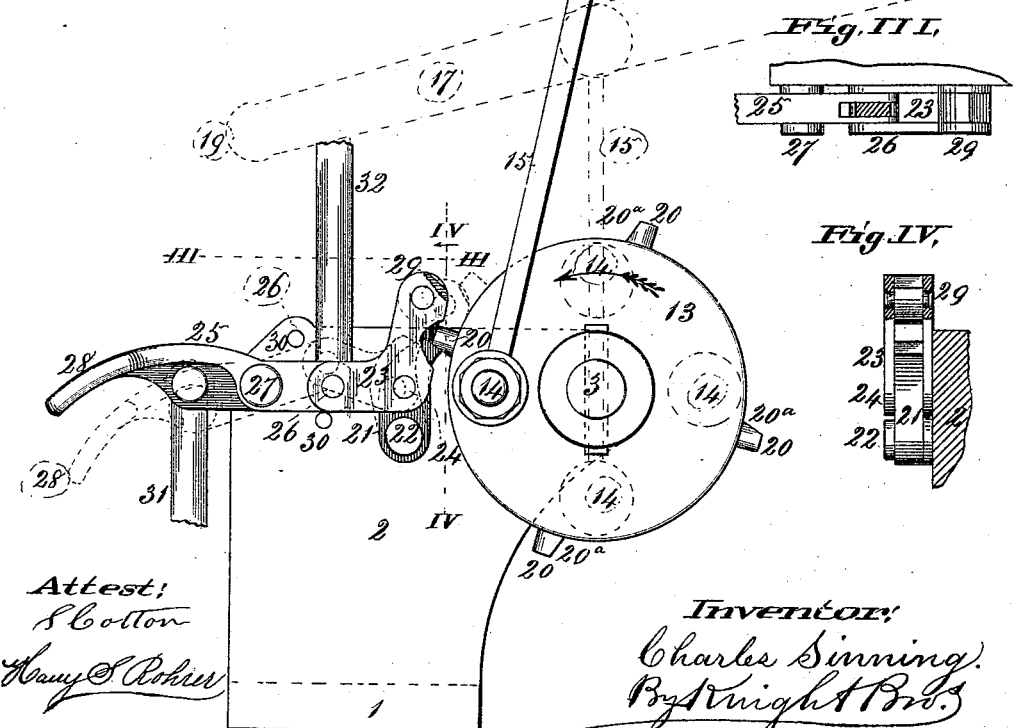
Attest:
S. Cotton
Harry S. Rohrer
Inventor:
Charles Sinning
By Knight Bro.
Attys

UNITED STATES PATENT OFFICE.

CHARLES SINNING, OF ST. LOUIS, MISSOURI, ASSIGNOR TO THE SINNING LASTING MACHINE COMPANY, OF SAME PLACE.

STOP-MOTION FOR LASTING-MACHINES, &c.

SPECIFICATION forming part of Letters Patent No. 471,495, dated March 22, 1892.

Application filed October 26, 1891. Serial No. 409,891. (No model.)

*To all whom it may concern:*

Be it known that I, CHARLES SINNING, of the city of St. Louis, in the State of Missouri, have invented a certain new and useful Improvement in Stop-Motions for Lasting-Machines, &c., of which the following is a full, clear, and exact description, reference being had to the accompanying drawings, forming part of this specification.

The novel features of the invention will be set forth in the claims.

Figure I is a rear elevation. Fig. II is a side elevation showing the arm in intermediate position, its extreme positions being indicated by dotted lines. Fig. III is a horizontal section taken at III III, Fig. II. Fig. IV is a vertical transverse section taken at IV IV, Fig. II.

1 is a base-frame having standards 2, in which the shaft 3 has bearing at 4.

5 is a friction-disk fast on the shaft, and 6 is a grooved pulley turning loose on the shaft and having at the side a friction-surface bearing against the side of the friction-disk. The pulley is pushed toward the disk by a spring 8 upon the shaft bearing against a collar 9, which in turn bears against the pulley-hub.

10 is a screw or pin in the collar, whose inner end has bearing in a longitudinal groove of the shaft. The collar 9 turns with the shaft, but has endwise movement thereon. At the opposite end from the collar 9 the spring bears against a movable collar 11, held in position on the shaft by a set-screw 12. By moving the collar 11 endwise on the shaft the tension of the spring 8 is regulated. The pulley 6 has constant rotation, and by its frictional bearing on the disk 5 tends to turn the shaft 3.

13 is a crank wheel or disk fast upon the shaft and having a crank-pin 14, connected by a rod 15 to a pin 16 on a lever 17. The lever 17 is fulcrumed at 18 and has at the free end an eye 19, that may be connected with the object whose position it is desired to change. The periphery of the wheel has four stop-pins or teeth 20, by which the rotation of the wheel may be arrested after a one-fourth rotation, so that the wheel has four positions, in two of which the lever 17 is held in an intermediate position, as seen in full lines in Fig. II, while in the other positions of the wheel the lever is in positions respectively above and below the intermediate position. The means for arresting the movement of the wheel by interposition of a stop in the course of the pins or teeth 20 will now be described.

21 is a dog pivoted at 22 to the standard 2, and whose normal position is shown by full lines in Fig. II. In the normal position the dog is in the course of the pins or teeth 20, so that the rotation of the wheel is arrested by it.

23 is a bell-crank composed of two parallel bars pivoted to the dog at 24. The horizontal arm of the bell-crank is pivoted to the end of a lever 25 by a pivot, forming a toggle-joint 26. The lever is fulcrumed to the standard at 27 and has an arm 28, that may be pressed down by either the hand or foot to throw upward the toggle-joint 26, and thereby draw back the dog from beneath the tooth 20 and allow the crank-wheel 13 to turn. As the dog is swung from beneath the tooth or pin 20 the upper end 29 of the bell-crank is thrown toward the wheel and into the course of the next tooth 20 and arrests the rotation of the wheel until the arm 28 is relieved from pressure, when the parts are returned to normal position by the action of the tooth. To enable the tooth to easily force back the upper end of the bell-crank, the teeth 20 are beveled on the advancing face 20ª, and their bearing may be against an anti-friction roller at this point, if desired. As the parts regain their normal position the dog is thrown into the course of the pin or tooth 20 which has just left the end 29 of the bell-crank, and thus the wheel is arrested after having made one quarter rotation.

30 are stop-pins limiting the upward and downward movements of the toggle. 31 and 32 are rods that may carry, respectively, a treadle below or a handle to give upward movement to the toggle-joint. It will be seen that the lever 17 always returns to an intermediate position from either of the extreme positions.

I claim as my invention—

1. The combination of the crank-disk 13, having teeth 20, a friction driving device for the disk, a detent adapted to arrest the rotary motion of the disk, a crank-pin 14 on the disk, and a rod 15, connected to an object to be moved, substantially as and for the purpose set forth.

2. The combination of the rod 15, disk 13, with crank-pin 14 and teeth 20, frictional driver for the disk, and detent consisting of the pivoted dog 21, lever 25, and bell-crank 23, pivoted to the dog and to the lever, substantially as set forth.

3. The combination of a shaft 3, carrying a loose pulley 6 and a crank-disk 13, a friction device by which the pulley actuates the crank-disk, a crank-pin 14 on the disk 13, connecting-rod 15, engaging the crank-pin, teeth 20 on the disk 13, and a detent device having a pivoted dog 21 engaging the teeth, a lever 25, and a bell-crank 23, pivoted to the dog and pivoted to the lever, forming a toggle-joint therewith, substantially as and for the purpose set forth.

4. The described combination of connecting-rod 15, crank-disk 13, with pin 14, shaft 3, loose pulley 6, friction-disk 5, spring 8, teeth 20, and detent composed of dog 21, bell-crank 23, and lever 25, all constructed and adapted to operate substantially as set forth.

CHARLES SINNING.

Witnesses:
SAML. KNIGHT,
A. M. EBERSOLE.